United States Patent Office 2,779,750
Patented Jan. 29, 1957

2,779,750

AlCl₃ CATALYZED POLYMERIZATION OF CLAY-PRETREATED NAPHTHAS

Mack C. Fuqua and Glen P. Hamner, Baton Rouge, La., assignors to Esso Research and Engineering Company, a corporation of Delaware No Drawing. Application April 1, 1953,
Serial No. 346,268

3 Claims. (Cl. 260—82)

This invention is broadly concerned with the production of resins and polymer products and the improvement of feed streams for subsequent processing.

During refining and processing operations, one method for utilizing petroleum fractions such as kerosene, gas oil, naphtha, and the like boiling from 350° up to 800° F., is to crack these fractions in the presence of 50 to 90 mole percent steam at temperatures above 1000° F. up to 1500° F. at relatively short contact times. The unsaturated product streams so obtained contain large quantities of olefins, diolefins, and aromatics in the $C_5$ to $C_{14}$ range. They are generally quite low in paraffin concentration.

These unsaturated streams boiling from 60 to 350° F. and intermediate fractions thereof, are capable of undergoing polymerization to give polymers and resins.

It has been known that cracked naphthas can be treated non-selectively with clays and the like to remove unsaturated materials which are likely to form gums and tars in later usage of the naphtha. In the past, this treatment was carried out with little or no control as to conditions of temperature, rate of contact, and the like. Any polymeric materials isolated were frequently dark in color and of poor drying properties.

It has now been found that careful and critical control of the contacting conditions during the period of polymerization can be utilized to produce specialized products of greater value and usefulness.

Thus, a steam cracked stream having a boiling range of 60 to 350° F. can be treated with attapulgus clay (predried at 1000° F.) at temperature of —94 to +184° F. to give light colored polymers having good drying properties. Such fractions can also be contacted with Friedel-Crafts catalysts such as aluminum chloride and boron fluoride at temperatures of 30 to 200° F. to give highly unsaturated, drying oil type polymers of good color properties. A temperature of 60 to 90° F. is preferred.

As a further feature of the invention, the steam cracked naphtha feeds are subjected to a preliminary clay treatment to remove a part or all of the most active components, including the diolefins, prior to a subsequent polymerization as, for instance, with a Friedel-Crafts catalyst. By carrying out the pretreatment in this manner, a substantially gel-free resin can be produced from the entire cracked feed stream.

A stream containing $C_5$ to $C_{14}$ components and boiling from 50 to 460° F., can be clay treated at —94 up to 300° F., 0.5–2 v./v./hr. and 50 to 200 pounds pressure to obtain yields of 5 to 20 weight percent clay polymer. The unreacted naphtha is separated from the polymer by distillation and the unreacted fraction subjected to Friedel-Crafts polymerization. The temperature range is critical for the preparation of good quality drying polymers.

These polymerizations may be carried out either as a slurry operation or as a fixed bed operation. An 8 to 50 mesh clay which has been predried may be used.

The invention will be illustrated in greater detail by the following examples although it is not intended to limit the invention thereto.

EXAMPLE 1

A sample of steam cracked feed stock boiling from 60 to 350° F. and containing $C_5$, $C_6$ and $C_7$ in the amount of 30, 50, 20 volume percent, respectively, was contacted in the liquid phase with attapulgus clay of 8 to 10 mesh which was predried at 1000° F. The contacting temperature was 100 to 125° F. at 1 v./v./hr. and 100 p. s. i. g. A yield of about 18 weight percent polymer was produced. When the polymer was diluted two fold with iso-octane, it gave a light transmission of 98%.

As a comparative example, the same feed stock was treated with the clay at 375° F. About 19 weight percent polymer product was obtained. A diluted sample of this polymer showed a light transmission of only 76%, indicating a polymeric material of very dark color was formed at the higher treating temperature.

EXAMPLE 2

A gas oil fraction boiling from 480 to 750° F. was subjected to a cracking operation at 1000 to 1500° F. in the presence of 50 to 90 mole percent steam. The cracked naphtha stream obtained was rich in olefins, diolefins and aromatics. This naphtha stream was fractionated and a fraction having a boiling range of 110 to 250° F. was selected for polymerization. Composition of a typical stream of this boiling range is 57 volume percent of olefins and diolefins with 43 volume percent aromatics. This stream is then refrigerated to a temperature of approximately —76 to —94° F. before activated clay (attapulgus clay baked at 1000° F.) is added. Approximately 2000 cc. of clay of 30 to 50 mesh were slurried with 4000 cc. of feed for two hours. The naphtha was then filtered to remove the clay. After distilling the naphtha from the polymer, approximately 9 weight percent polymer was obtained. The polymer was very light in color (light yellow) and very high in unsaturation. The iodine number on the polymer was in excess of 40, which is much higher than that obtained on polymers produced at high temperatures. A polymer produced at 300° F. has an iodine number of 250–300. The polymer absorbed in the clay during the polymerization step was extracted with ethyl ether. After flashing of the ethyl ether approximately 7 weight percent polymer was obtained. Although the polymer was somewhat darker (light red) the same characteristic unsaturation was obtained as with the original product.

Samples of these polymers from clay treated streams were incorporated into blends to make drying films and to make films from varnish blends by cobodying with linseed oil. Comparative blends were also made up from the high temperature polymers and these were tested. The results of these comparative tests are shown in Tables I and II below. These test results show quite clearly that the polymers from the low temperature clay treatment are quite satisfactory as film forming drying oils.

Table I
THE PROPERTIES OF UNTREATED POLYMER FILMS

| Sample | Drying Time (hrs.)[1] | | | | | 2 Days[2] | | 7 Days[2] | | | Baked 1 hr. @ 250° F.[2] | | |
|---|---|---|---|---|---|---|---|---|---|---|---|---|---|
| | 1 | 2 | 4 | 6 | 24 | Hard | Flex | Hard | Flex | Color | Tack | Hard | Flex |
| High temperature Polymer | 5 | 0 | 0 | 0 | 0 | 3 | 5 | 3 | 6 | 7 | 0 | 4 | 8 |
| Panapol 2C | 9 | 8 | 6 | 4 | 1 | 2 | 5 | 2 | 6 | 5 | 0 | 3 | 4 |
| Panapol 3D | 8 | 7 | 3(s) | 2(s) | 1(s) | 7 | 5 | 6 | 5 | 2 | 0 | 5 | 9 |
| Clay Sample #1 | 1 | 0 | 0 | 0 | 0 | 4 | 8 | 1 | 8 | 2 | 0 | 0 | 6 |
| Clay Sample #2 | 1 | 0 | 0 | 0 | 0(s) | 7 | 5 | 6 | 6 | 2 | 0 | 3 | 7 |

| Sample | Resistance Properties[3] | | | | | | | | Baked 1 hr. @ 250° F. | | | |
|---|---|---|---|---|---|---|---|---|---|---|---|---|
| | Air Dried 2 Days | | | | Air Dried 7 Days | | | | | | | |
| | Water | Soap | Grease | Caustic | Water | Soap | Grease | Caustic | Water | Soap | Grease | Caustic |
| High temperature Polymer | 3 | 6 | 9 | 4 | 2 | 6 | 9 | 2 | 0 | 0 | 9 | 2 |
| Panapol 2C | 3 | 6 | 9 | 2 | 4 | 8 | 9 | 0 | 0 | 3 | 9 | 0 |
| Panapol 3D | 7 | 5 | 9 | 4 | 0 | 4 | 9 | 3 | 0 | 0 | 0 | 0 |
| Clay Sample #1 | 3 | 0 | 1 | 0 | 4 | 0 | 0 | 3 | 0 | 0 | 0 | 2 |
| Clay Sample #2 | 3 | 5 | 0 | 5 | 2 | 3 | 0 | 3 | 0 | 0 | 0 | 0 |

[1] Drying time and tack, scale: 0—tack free; 6—set to touch; 9—wet.
[2] Hardness scale: 0—hard, impenetrable with a fingernail; 1-4—can be scratched; 5-9—penetrable to very soft. Flexibility: After 180° bend test on tinplate panels, scale: 0—unaffected; 1-3—discolored or hazed; 4-6—fine minute cracking; 7-9—deep cracking and peeling. Color scale: 0—very light; 9—deep amber film.
[3] Spot tests for resistance properties: distilled water 5 hours, soap and grease 2 hours, 1% caustic 1 hr. Scale: 0—unaffected; 1-3—hazed or whitened; 4-6—loss in adhesion and softened; 7-9—pinholed and blistered to failure by removal of the film.
(s) Surface dried, a soft sticky substrata.

Table II
PROPERTIES OF FILMS FORMED FROM POLYMER-VARNISH BLENDS

| Samples Used in Blend | Drying Time, Hours[1] | | | | | 2 Days[2] | | 7 Days,[2] Flex | 14 Days,[2] Flex | Baked 1 Hr. @ 250° F.[2] | | |
|---|---|---|---|---|---|---|---|---|---|---|---|---|
| | 1 | 2 | 4.5 | 6 | 24 | Hard | Flex | | | Hard | Flex | Color |
| High temperature Polymer | 6 | 5 | 3 | 2 | 0 | 0 | 5 | 6 | 6 | 64 | 6 | 6 |
| Panapol 2C | 7 | 5 | 4 | 3 | 1 | 0 | 6 | 6 | 6 | 46 | 0 | 5 |
| Panapol 3D | 6 | 4 | 5 | 2 | 0 | 0 | 6 | 6 | 6 | 74 | 5 | 3 |
| Clay Sample #1 | 5 | 2 | 1 | 2 | 0 | 0 | 6 | 6 | 6 | 18 | 5 | 5 |
| Clay Sample #2 | 5 | 3 | 0 | 0 | 0 | 0 | 6 | 6 | 6 | 40 | 6 | 5 |

RESISTANCE PROPERTIES[3]

| Sample Used in Blend | Air Dried 2 Days | | | | Air Dried 7 Days | | | | Air Dried 14 Days | | | |
|---|---|---|---|---|---|---|---|---|---|---|---|---|
| | Water | Soap | Grease | Caustic | Water | Soap | Grease | Caustic | Water | Soap | Grease | Color |
| High temperature Polymer | 3 | 2 | 2 | 0 | 0 | 1 | 0 | 0 | 2 | 4 | 0 | 1 |
| Panapol 2C | 3 | 3 | 2 | 2 | 0 | 1 | 0 | 0 | 1 | 4 | 0 | 1 |
| Panapol 3D | 3 | 3 | 2 | 0 | 0 | 1 | 0 | 0 | 0 | 2 | 0 | 2 |
| Clay Sample #1 | 3 | 0 | 3 | 0 | 0 | 1 | 0 | 3 | 0 | 2 | 0 | 4 |
| Clay Sample #2 | 1 | 4 | 2 | 0 | 0 | 0 | 0 | 0 | 0 | 2 | 0 | 2 |

RESISTANCE PROPERTIES OF FILMS BAKED 1 HR. @ 250° F.

| Sample Used in Blend | Water | Soap | Grease | Caustic |
|---|---|---|---|---|
| High temperature Polymer | 0 | 0 | 0 | 0 |
| Panapol 2C | 0 | 0 | 0 | 0 |
| Panapol 3D | 0 | 0 | 0 | 0 |
| Clay Sample #1 | 0 | 0 | 0 | 0 |
| Clay Sample #2 | 0 | 0 | 0 | 0 |

Footnotes are the same as in Table I.

EXAMPLE 3

Experiments have also shown that the liquid streams from steam cracking operations can be treated with Friedel-Crafts polymerization catalysts to give polymeric products having drying oil properties.

A number of polymer samples were prepared from aromatic distillate of 60 to 350° F. boiling range by treating the feed with aluminum chloride and boron fluoride. The data obtained is tabulated in Table III below. Run No. 8 substantially shows the results obtained by the treatment of the unsaturated feed with clay at 300-350° F. These data indicate that, while some improvement is noted by substitution of the Friedel-Crafts type catalysts for the clay treatment, polymers having better drying oil properties can be obtained by the use of clay in conjunction with controlled lower temperatures. These conditions yield polymer of lighter color and more attractive drying properties.

Table III
ALUMINUM CHLORIDE AND BORON TRIFLUORIDE POLYMERIZATION

| Run No. | Catalyst Used | Catalyst solvent used | Temperature Range of Reaction | Catalyst Utilization [1] | Polymer Characteristics | | | |
|---|---|---|---|---|---|---|---|---|
| | | | | | Color,[2] percent | Viscosity,[3] SSU @ 210, Sec. | $I_2$ No. | Mol. Wt. |
| 1 | $AlCl_3$ | None | 38–60° F | 0.16 | 76 | 592 | 223 | 516 |
| 2 | $AlCl_3$ | Ethyl Ether | 43–87° F | 0.06 | 84 | 149 | 295 | 451 |
| 3 | $AlCl_3$ | N-Propyl Chloride | 100–150° F | 0.04 | 86.5 | 360 | 252 | |
| 4 | $AlCl_3$ | Nitro Benzene | 100–140° F | 0.05 | 82.2 | 412 | 281 | |
| 5 | $AlCl_3$ | Ethyl Chloride | 90–120° F | 0.04 | 92 | 900 | 350 | 662 |
| 6 | $BF_3$ | Ethyl Ether | 140–175° F | 0.2 | 95 | 190 | 274 | 375 |
| 7 | $BF_3$ | do | 40–60° F | 0.07 | 91 | 142 | 366 | 548 |
| 8 | Attapulgus Clay | | 300–350° F (high temp.) | | 85 | 400 | 350 | 450 |

[1] Grams of catalyst per gram of polymer.
[2] Percent light transmission of a sample diluted twofold with iso-octane.
[3] Viscosity data on polymer samples at constant NVM content of 80%.

EXAMPLE 4

One method by which valuable products can be prepared from treating steam cracked distillate streams involves a pretreatment with clay to give an improved unsaturated feed stream which is subsequently subjected to polymerization, for instance, with a Friedel-Crafts catalyst.

A steam cracked distillate stream containing $C_5$ to $C_{14}$ components and having large quantities of diolefins, olefins, and aromatics was subjected to clay treatment at about 300° F. and 0.5 v./v./hr. The unreacted naphtha was flashed to separate the polymer. The separated naphtha was treated with excess $AlCl_3$ at 120–160° F. for four hours. The catalyst was added in increments to control the temperature between 120 and 160° F. Catalyst was added until there was no further rise in temperature. A yield of 44.5 weight percent resin was obtained as determined by ASTM NVM procedure. The resin was recovered by distillation. Inspection data on this resin were as follows:

| | |
|---|---|
| Iodine No. cg./g | 179 |
| Molecular weight | 1189 |
| Softening point, ° F | 195 |
| Gardner color,[1] diluted | 3–4 |

[1] 1 gram polymer/67 ml. xylene.

EXAMPLE 5

A sample of naphtha containing $C_5$ to $C_8$ components and boiling from 80 to 300° F. was also clay treated at 250 to 300° F. for 1 v./v./hr. and 100 pounds pressure. The clay treated naphtha had the following boiling range:

ASTM Distillation—

| | |
|---|---|
| IBP, ° F | 130 |
| 5 | 140 |
| 10 | 146 |
| 20 | 152 |
| 30 | 158 |
| 40 | 164 |
| 50 | 170 |
| 60 | 176 |
| 70 | 184 |
| 80 | 198 |
| 90 | 224 |
| 95 | 266 |
| FBP | 364 |
| Recovery, ml | 99 |
| Gravity, API @ 60° F | 52.7 |

A yield of 6–8 weight percent clay polymer was obtained. The unreacted naphtha was then $AlCl_3$ (1 wt. percent) treated at 80–100° F. for 30 minutes. A yield of 20.7 weight percent resin was obtained.

Inspections on this material were as follows:

| | |
|---|---|
| Iodine No. cg./g | 205 |
| Softening point, ° F | 194 |
| Gardner color,[1] diluted | 2 |
| Aniline point, ° F | 152 |

[1] 1 gram polymer/67 ml. xylene.

What is claimed is:

1. A process for treating unsaturated steam cracked feed streams and making improved yields of resinous polymers therefrom which comprises subjecting a cracked petroleum fraction boiling from 80 to 300° F. and containing olefins, diolefins, and aromatics to treatment with predried clay at about 250 to 300° F. at 0.5 to 2.0 v./v./hr., separating the unreacted naphtha from the resultant polymer and subsequently polymerizing solely the separated unreacted naphtha with a Friedel-Crafts catalyst and separating the resinous polymer formed thereby.

2. A process for treating unsaturated steam-cracked polymer feed streams and subsequently making improved yields of resinous polymers therefrom which comprises subjecting a steam cracked fraction boiling from 80 to 300° F. and containing diolefins, olefins and aromatics of the $C_5$ to $C_8$ range to clay treatment at 250–300° F. for 0.5 to 1.0 v./v./hr., separating the unreacted naphtha from the resultant polymer, and subsequently polymerizing solely the separated unreacted naphtha with $AlCl_3$ at 60 to 100° F., and isolating the resinous polymer formed thereby.

3. Process according to claim 2 in which the clay is predried attapulgus clay.

References Cited in the file of this patent

UNITED STATES PATENTS

| | | |
|---|---|---|
| 1,888,044 | Morrell | Nov. 15, 1932 |
| 2,119,976 | Wilson | June 7, 1938 |
| 2,234,660 | Thomas | Mar. 11, 1941 |
| 2,516,230 | Marhofer | July 25, 1950 |